United States Patent
Allwein et al.

[11] Patent Number: 5,817,387
[45] Date of Patent: Oct. 6, 1998

[54] ENCAPSULATED INSULATION ASSEMBLY

[75] Inventors: Robert J. Allwein; Vernon C. Plotts; Dennis R. Larratt, all of Littleton, Colo.

[73] Assignee: Johns Manville International, Inc., Denver, Colo.

[21] Appl. No.: 796,825

[22] Filed: Feb. 6, 1997

[51] Int. Cl.⁶ ........................................................ B32B 3/00
[52] U.S. Cl. ........................ 428/43; 428/71; 428/74; 428/76; 428/131
[58] Field of Search .................. 428/71, 74, 76, 428/43, 131

[56] References Cited

U.S. PATENT DOCUMENTS

| | | | |
|---|---|---|---|
| 5,160,773 | 11/1992 | Sassa | 428/74 |
| 5,236,754 | 8/1993 | McBride et al. | 428/74 |
| 5,391,415 | 2/1995 | Bair | 428/74 |
| 5,508,079 | 4/1996 | Grant et al. | 428/74 |
| 5,545,453 | 8/1996 | Grant | 428/43 |
| 5,601,896 | 2/1997 | Bodine et al. | 428/74 |

Primary Examiner—James J. Bell
Attorney, Agent, or Firm—Robert D. Touslee

[57] ABSTRACT

A modularized, encapsulated insulation assembly includes a plurality of insulation modules which each include a compressible, resilient insulation material encapsulated within a vented, flexible envelope which overlays and encloses the major surfaces, lateral surfaces, and at least the end surfaces of the insulation material at the ends of insulation modules facing other modules of the assembly. Where both ends of the insulation material in an insulation module are enclosed within the envelope, the envelope is vented to permit air to pass through the envelope during the compression and recovery of the insulation module. Each adjacent pair of insulation modules is joined by a flexible connector strip which extends between adjacent ends of the insulation modules and lies either substantially in the plane of one of the major surfaces or about midway between the major surfaces of the insulation modules. The insulation modules may differ in length and provide a location between the insulation modules where utilities can pass when the modularized, encapsulated insulation assembly is installed.

29 Claims, 3 Drawing Sheets

ENCAPSULATED INSULATION ASSEMBLY

BACKGROUND OF THE INVENTION

The present invention relates to an insulation assembly and, in particular, to an insulation assembly which includes a plurality of encapsulated insulation modules that are joined together by flexible connector strips.

Building structures, such as homes, industrial buildings, office buildings, mobile homes, prefabricated buildings and similar structures typically include walls (both interior and exterior), ceilings, floors and roofs which are insulated for both thermal and acoustical purposes, especially the exterior walls and roofs of such structures. The walls, ceilings, floors and roofs of these structures include spaced-apart framing members, e.g. studs, rafters, joists, beams and similar support members, to which sheathing, paneling, lathing, wallboard or similar structural boarding or sheet materials are secured to form walls, ceilings, floors and roofs having cavities therein defined by the framing members and the boarding or sheet materials.

These cavities typically have standard dimensions, e.g. wall cavities in homes typically are about ninety three inches high or long by about fourteen and one-half or twenty two and one-half inches wide when framed with wooden studs or about sixteen or twenty four inches wide when framed with metal studs. The fibrous batts of insulation typically used to thermally and/or acoustically insulate such cavities are typically about ninety four inches long by either fifteen or twenty three inches wide when insulating cavities framed with wooden studs and ninety six inches long by either sixteen or twenty four inches wide when insulating cavities framed with metal studs. The fibrous batts vary in thickness from about three and one half inches to about six and one half inches. Thus, when the fibrous batts are installed in such cavities, there is a friction fit between the batts and the side and end walls of the cavities to help hold the fibrous insulation batts in place. In ceilings, floors and roofs the insulation batts are typically greater than six and one half inches in thickness and can be much thicker e.g. thirteen inches or more in thickness.

Fibrous insulation assemblies are currently known wherein a single binderless fibrous insulation batt is encapsulated within an envelope, such as a polymeric film, to confine dust and loose fibers within the insulation assembly and provide a relatively smooth, non-irritating outer surface on the insulation assembly for handling. One such insulation assembly is disclosed in U.S. Pat. No. 5,277,955; issued Jan. 11, 1994. While the patent states that such insulation assemblies can be used to insulate the walls, ceilings and floors of buildings, there is a need for insulation assemblies which provide the end user or installer with greater flexibility at a job site so that shorter than standard length or height wall cavities and the like can be insulated with the insulation assemblies without having to cut open the envelope and utilities and the like, such as electrical wiring, can pass through the cavities being insulated with the insulation assemblies without having to cut open the envelope.

SUMMARY OF THE INVENTION

The encapsulated insulation assembly of the present invention provides a solution to the above needs by providing a modularized encapsulated insulation assembly that: a) in addition to being sized to insulate standard length cavities, can be selectively separated into two or more encapsulated insulation modules to insulate wall, ceiling, floor or roof cavities shorter than the standard height or length of such cavities without cutting open the envelope; b) has spaced apart encapsulated insulation modules which can be installed in a wall, ceiling, floor or roof cavity to provide one or more convenient locations within the cavity being insulated through which electrical wiring or other utilities can pass without having to cut open the encapsulating envelope; and c) permits relatively high R value encapsulated insulation modules to be easily folded over upon adjacent modules for packaging and shipment or for providing a product with an even higher R value.

The encapsulated insulation assembly of the present invention includes at least two insulation modules, but may include more than two insulation modules. The insulation modules of the modularized, encapsulated insulation assembly are each less than the standard length or height of a wall cavity, but the combined lengths of the insulation modules preferably equal or are somewhat greater than the standard length or height of wall cavities which are about ninety three to ninety six inches in height or length. In one embodiment of the present invention, the encapsulated insulation assembly can include a series or plurality of insulation modules of substantially equal length which are packaged and shipped in roll form.

Each insulation module includes a compressible, resilient insulation material encapsulated within a vented, flexible envelope which overlays and encloses the major and lateral surfaces of the insulation material and which may also overlay and enclose the end surfaces of the insulation material. When the insulation material is otherwise completely enclosed within the envelope, the envelope is vented, e.g. at the ends, to permit air to pass through the envelope during compression and recovery of the insulation module. The insulation modules are joined by a flexible connector strip which extends between adjacent ends of the insulation modules and lies either substantially in the plane of one of the major surfaces of the insulation material or about midway between the major surfaces of the insulation material. In one embodiment the connector strip not only provides a means for selectively separating one or more encapsulated insulation modules from an encapsulated insulation assembly, but also provides one or more locations between the insulation modules of the encapsulated insulation assembly which: a) permit the passage of electrical wiring, plumbing and other utilities (hereinafter referred to as "utilities") through the cavity being insulated without having to cut open the envelopes of the insulation modules; and b) enclose the utilities between adjacent ends of the insulation modules. Thus, the encapsulated insulation assembly of the present invention can be folded for shipment and packaging; separated into one or more modules to fit nonstandard sized cavities; and in certain embodiments, the modules of the insulation assembly can be folded over upon each other to form a double thick insulation.

DESCRIPTION OF THE PREFERRED EMBODIMENTS

Figure 1:
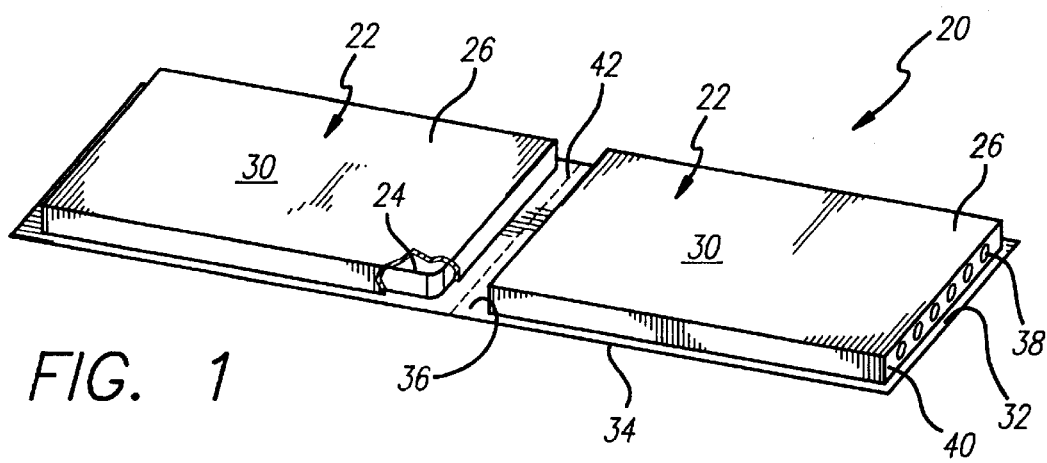
FIG. 1 is a schematic perspective of a first embodiment of the encapsulated insulation assembly of the present invention.

FIGS. 1–6 show a modularized, encapsulated insulation assembly 20 of the present invention for thermally and/or acoustically insulating wall, ceiling, floor and roof cavities of both standard and nonstandard lengths. Each modularized, encapsulated insulation assembly 20 includes at least two insulation modules 22 having an insulation material 24 encapsulated within an envelope 26 and may be compressed and packaged in a flat batt or roll form.

The insulation material 24 is a fibrous, foam or similar insulation material, but preferably, the insulation material is a fibrous insulation material, such as conventional glass fiber insulation material which is both compressible and resilient. Where a fibrous batt or blanket is used as the insulation material 24, such as a glass or other mineral fiber batt or blanket or a polymeric fiber batt or blanket, the fibers of these batts or blankets may be bonded together with a binder (e.g. phenol/formaldehyde resole resins or water deliverable acrylic based binders), by direct heat bonding between the fibers, or by other means to give the batt or blanket integrity and resilience (hereinafter referred to as "bonded fibrous insulation material"). These batts or blankets can also be binderless or essentially binderless (i.e. quantitatively less than 1% by weight binder) with the fibers of these batts or blankets being held together mainly by fiber entanglement (hereinafter referred to as "unbonded fibrous insulation material"). In addition to the preferred insulation materials, the insulation material 24 can also be a polymeric foam insulation material which preferably is both compressible and resilient.

As shown in FIGS. 1–3, 5 and 6 the insulation materials 24, encapsulated within the envelope 26 of the insulation modules 22, are typically about forty six to about forty eight inches long (about one half the height of a standard wall cavity which range from about ninety three to about ninety six inches long). However, for ceiling heights of about one hundred and eight inches or about one hundred and twenty inches, the lengths of the insulation modules 20 of FIGS. 1–3, 5 and 6 can be greater. Typically, the insulation modules 20 are either about fifteen, sixteen, twenty three or twenty four inches wide (the standard insulation widths for wall and ceiling or floor cavities). For encapsulated insulation assemblies 20 having more than two insulation modules, such as the encapsulated insulation assembly of FIG. 4, the insulation modules 22 may each have shorter lengths (preferably, lengths ranging from about thirty two to about twelve inches long). The insulation materials 24 typically range in thickness from about three and one half to about six and one half inches for walls with R values ranging from eleven to twenty-two and from about six and one half to about thirteen inches for ceilings and the like with R values of nineteen or greater.

Preferably, the envelope 26 is a thin pliable or flexible sheet which may or may not be porous, such as but not limited to, a polyethylene or other polymeric film; kraft paper; non-woven fabric; combinations or laminates thereof and similar sheet or facing materials. A preferred thin polymeric film used for forming the envelope 26 is an air permeable or impermeable, pliable film, such as but not limited to, a polyethylene film about 0.1 to about 1.5 mils thick which may be metalized.

Figure 5:
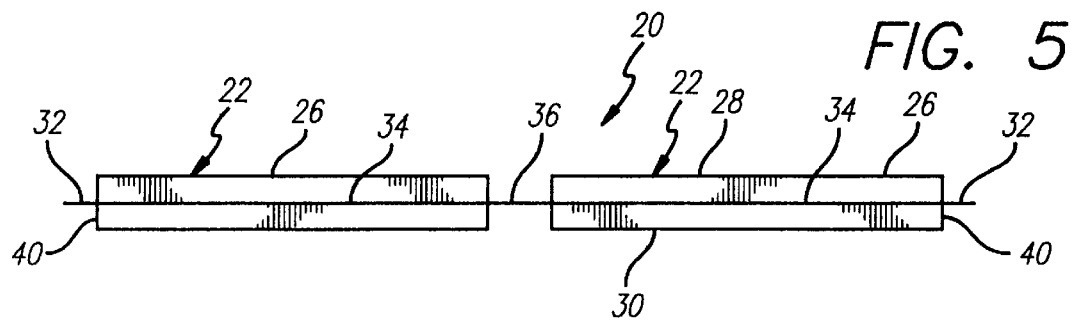
FIG. 5 is a schematic side view of a second embodiment of the encapsulated insulation assembly of the present invention.
Figure 6:
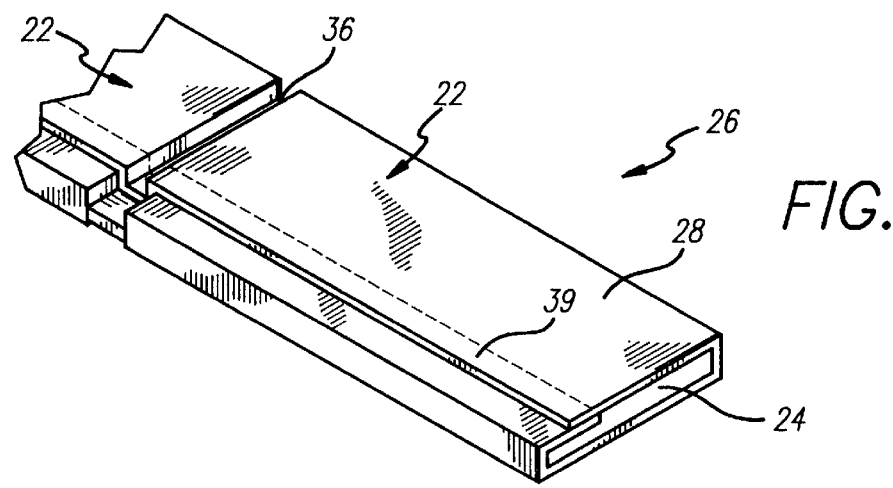
FIG. 6 is a schematic perspective view of a third embodiment of the encapsulated insulation assembly of the present invention.

As shown in FIGS. 1–11, the envelope 26 encapsulates the insulation material 24 of each module 22 by overlaying both major surfaces, the two side edges, and the end edges of the insulation material at the ends of the insulation modules 22 facing other of the insulation modules 22 of the encapsulated insulation assembly 20. As shown in FIGS. 1–5, the envelope 26 can overlay the two outer end edges of the insulation material 24 of the insulation modules 22 at the opposite ends of the encapsulated insulation assembly 20 or, as shown in FIG. 6, the two outer end edges of the insulation material 24 of the insulation modules 22 at the opposite ends of the encapsulated insulation assembly 20 may be exposed.

As shown in FIGS. 1–5, the envelope 26 may include a first sheet of facing material 28 and a second sheet of facing material 30. These sheets of facing material 28 and 30 are joined together by an adhesive, a pressure sensitive adhesive, heat welds or by otherwise securing the sheets of facing material 28 and 30 together at and along end tabs 32, side tabs 34 and connector strips 36. By encapsulating the insulation material 24 of the modularized, encapsulated insulation assembly 20 within an envelope 26, dust and/or loose fibers or particles from the insulation material 24, created during the manufacture, encapsulating, packaging, shipping, handling and installation of the modularized, encapsulated insulation assembly 20, are contained within the envelope 26 thereby reducing the likelihood of the dust and fibers becoming a possible irritant to the workers handling and installing the insulation assemblies.

FIG. 6 shows an encapsulated insulation assembly 20 wherein the envelope 26 is made of a single sheet of facing material 28 which is wrapped completely around the insulation material 24 and overlapped. The facing material 28 is bonded to itself along the longitudinally extending overlap 39 and at the connector strips 36 and end tabs, if used, by an adhesive, a pressure sensitive adhesive, heat welds or by otherwise securing the sheet of facing material 28 to itself. While the ends of the insulation material 24 in the modules 22 of FIG. 6, facing other modules 22 of the encapsulated insulation assembly 20, are covered by the envelope 26, the envelope 26, as shown in FIG. 6, does not overlay the two end edges of the insulation material 24 at the opposite ends of the encapsulated insulation assembly 20.

Insulation materials, such as the modularized, encapsulated insulation assemblies 20 of the present invention are normally compressed for packaging to reduce the volume of the insulation product for shipping and handling, e.g. the volume of the insulation materials is reduced by a factor of up to seventeen to one. The compression of such insulation materials for packaging typically is accomplished within a few seconds. Thus, where the ends of the insulation material are also encapsulated, the envelope 26 is vented, preferably, by using a porous membrane or film, such as a non-woven fabric material, or by providing a series of vent holes 38 in the end walls 40 of the envelope 26 overlaying the end edges of the insulation material 24 to permit the air to be rapidly discharged from within the envelope 26 during such compression packaging operations. The size and number of the vent holes 38 in each end wall 40 of the envelope 26 may vary. However, a series of vent holes (between about ¼ and about ½ of an inch in diameter), slits or other venting means 38 that permit the air to be discharged from the insulation modules 22 within a few seconds is preferred.

When insulation materials, such as the modularized, encapsulated insulation assemblies 20, are removed from the packages in the field, e.g. at the job site, the insulation assemblies are typically allowed at least twelve minutes to recover from their compressed state to their nominal thicknesses. Thus, when the envelope 26 is made in whole or in part from an air permeable material, the vent holes 38 may be eliminated by waiting to secure together the end tabs 32 of the end walls 40 of the modularized, encapsulated insulation assemblies 20 after the assemblies 20 have been compressed in the packaging operation. The end tabs 32 could be secured together by applying a pressure sensitive adhesive to the mating faces of the facing materials in the end tabs and pressing the mating faces of the end tabs 32 together after the air has been discharged from the insulation modules 22 in the packaging operation.

Figure 2:
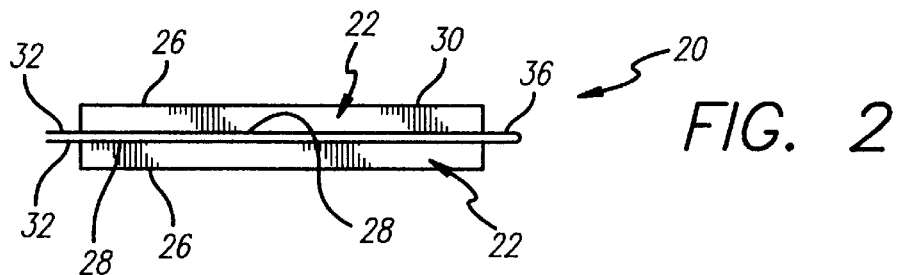
FIG. 2 is a schematic side view of the encapsulated insulation assembly of FIG. 1 folded over so that one module overlays the other module.
Figure 3:
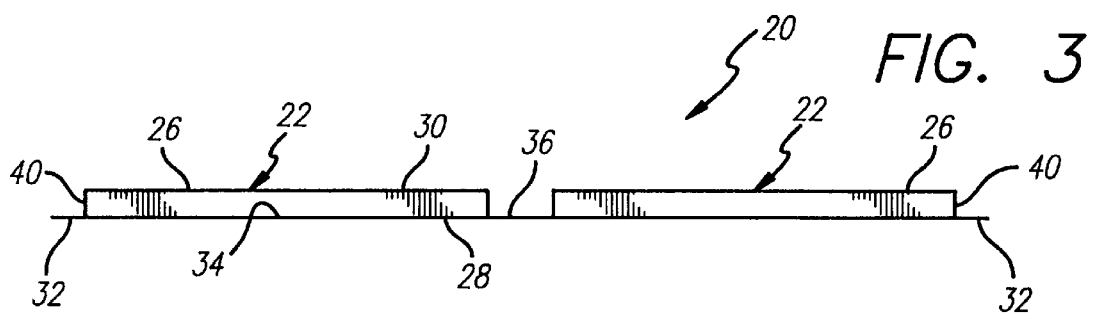
FIG. 3 is a schematic side view of the encapsulated insulation assembly of FIGS. 1 and 2.
Figure 4:
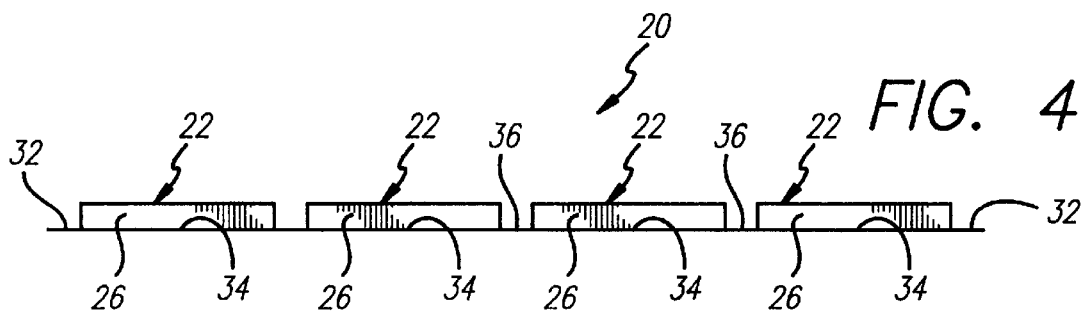
FIG. 4 is a schematic side view of the first embodiment of the encapsulated insulation assembly of the present invention having more than two insulation modules.

In the embodiments of FIGS. 1–5, the first sheet of facing material 28 overlaying one major surface of the insulation material 24 in each of the insulation modules 22 and the second sheet of facing material 30 overlaying the other major surface of the insulation material 24 in each of the insulation modules 22 can be made of the same materials, e.g. both polymeric films having the same physical characteristics, or different types of sheets or facing materials, e.g. kraft paper on one major surface of the insulation material 24 and polymeric film on the other major surface of the insulation material 24. The side edges and end edges of the insulation material 24 in each of the insulation modules 22 of the modularized, encapsulated insulation assembly are covered by one sheet of facing material 30, as shown in FIG. 3, or by both of the sheet materials 28 and 30, as shown in FIG. 5.

In one embodiment of the modularized, encapsulated insulation assembly 20, the sheet of facing material 28 is selected to have a permeability, such that when the modularized, encapsulated insulation assembly 20 is folded upon itself, as shown in FIG. 2, to bring the sheet of facing material 28 of the two insulation modules 22 in face to face contact, the combined double layer of facing material 28 within the folded modularized, encapsulated insulation assembly 20 will have a permeability sufficiently high to prevent the double layer of facing material from functioning as a vapor barrier (generally a permeability of 10 perms or more). This permits the folded modularized, encapsulated insulation assembly 20, as shown in FIG. 2, to be used as a double thick layer of insulation. While being especially useful for encapsulated insulation assemblies 20 having lower R values (e.g. R11 through R19), encapsulated insulation assemblies having higher R values (e.g. R19 through R25) can also be folded over to increase their thermal and/or acoustical performance. The sheet of facing material 30 overlaying the other major surface of the insulation material in the modularized, encapsulated insulation assembly 20 of this embodiment can be made of the same facing material as 28 or another type of facing material.

The end tabs 32, the side tabs 34 and the connector strip 36 joining the facing materials 28 and 30 together can be located in a plane or substantially in a plane coinciding with one of the major surfaces of the insulation material 24 or module 22 so that the modularized, encapsulated insulation assembly 20 folds in this plane (a face folding assembly as shown in FIGS. 1–4 and 6) or the end tabs 32, the side tabs 34 and the connector strip 36 joining the facing materials 28 and 30 together can be located in a plane located midway or substantially midway between and extending parallel to the planes of the major surfaces of the insulation material 24 or module 22 so that the modularized, encapsulated insulation assembly 20 folds in this intermediate plane (a center folding assembly as shown in FIG. 5).

As shown in FIG. 1, the connector strip 36 of that embodiment and the connector strip or strips of all of the embodiments of the invention (connector strips 36, 50 and 68) are preferably provided with a weakened tear line, such as tear line 42, to permit the two or more insulation modules 22 of the modularized, encapsulated insulation assembly 20 to be quickly and easily separated, without tearing or cutting open the envelope 26 and exposing the encapsulated insulation material 24. With the weakened tear line 42, the insulation modules 22 can be separated by merely tearing the connector strip 36 along the weakened tear line 42. This permits the insulation modules 22 to be quickly and easily separated for insulating wall cavities that are less than the standard height or length, as well as floor, ceiling or roof cavities of varying lengths. Preferably, the weakened tear line 42 is a perforated tear line extending completely across the connector strip 36.

Figure 7:
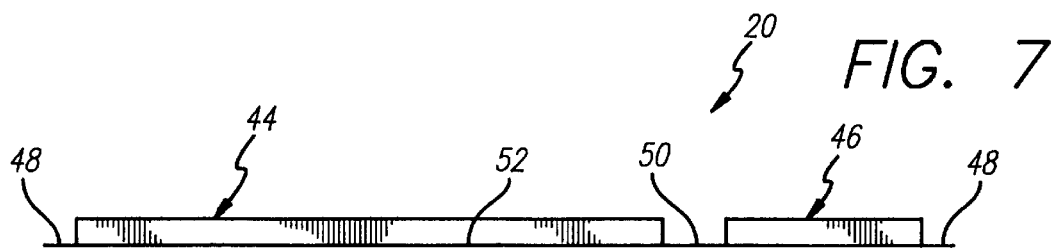
FIG. 7 is a schematic side view of a fourth embodiment of the encapsulated insulation assembly of the present invention for accommodating the passage of utilities through the insulation assembly.
Figure 8:
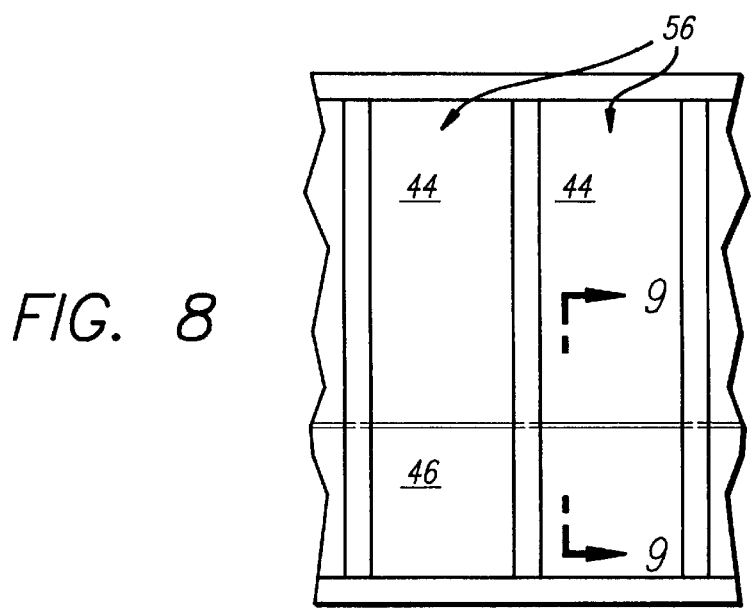
FIG. 8 is a schematic elevation of the framing in a wall with the encapsulated insulation assembly of FIG. 7 installed and electrical wiring passing through the wall.
Figure 9:
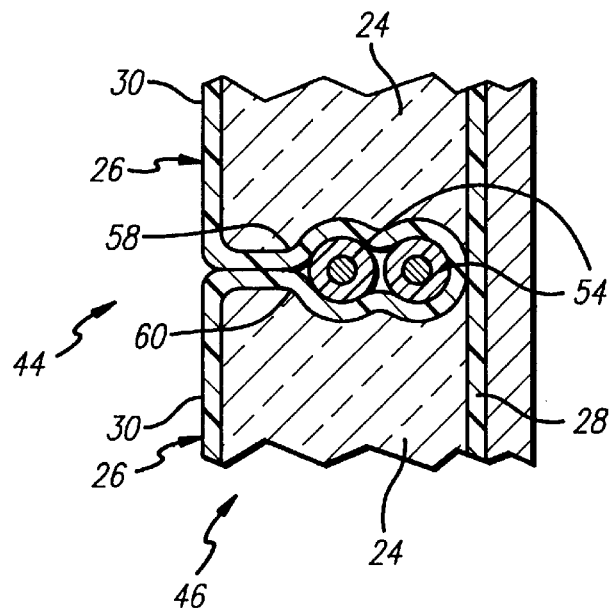
FIG. 9 is an enlarged sectional view taken substantially along lines 9—9 of FIG. 8 to schematically show electrical wiring being enclosed between the ends of the insulation modules.

FIGS. 7–9 show an embodiment of the modularized, encapsulated insulation assembly 20, especially adapted for insulating walls, which has a first insulation module 44 that is about three to five times as long as the second insulation module 46. The two insulation modules are sized in length to permit electrical wiring, plumbing or other utilities to pass through the cavities being insulated by the assemblies at a convenient location or height without having to remove any insulation material or cut open the envelope 26 encapsulating the insulation material 24 within the insulation modules. Other than the different lengths of the two insulation modules 44 and 46, this embodiment of the modularized, encapsulated insulation assembly 20 is the same as the embodiment of FIGS. 1–6.

The combined lengths of the first insulation module 44 and the second insulation module 46, excluding the end tabs 48 and the connector strip 50, equals or about equals the standard height of a wall cavity e.g. about ninety three to about ninety six inches. The widths of the first insulation module 44 and the second insulation module 46, excluding the side tabs 52, equals or about equals a standard insulation width for wall cavities, e.g. about fifteen, sixteen, twenty three or twenty four inches in width. The insulation materials 24 within the insulation modules typically range in thickness from about three and one half to about six and one half inches and have R values ranging from 11 to 22.

In a preferred form of this embodiment of the invention, the first or upper insulation module 44 is about sixty to about eighty four inches in length and the second or lower insulation module 46 is about twelve to about thirty six inches in length. While the connector strip 50 can be a center fold strip, preferably, the connector strip 50 is a face folding strip, as shown in FIGS. 5 and 7, so that the connector strip 50 does not obstruct the passage of the utilities through the cavity being insulated.

As shown in FIGS. 8 and 9, when a wall or the like is insulated with the modularized, encapsulated insulation assembly 20 of FIG. 7, the electrical wiring 54, plumbing or other utilities can be passed through the cavities 56 insulated by the modularized, encapsulated insulation assemblies without the need to cut or tear open the encapsulating envelope 26. The insulation material 24 within the insulation modules 44 and 46 is preferably a compressible and resilient insulation material, such as glass fiber insulation, and the combined lengths of the insulation modules 44 and 46 (as discussed above) is preferably at least equal to and most preferably greater than the height or length of the wall cavity being insulated. Accordingly, after the utilities 54 have been passed through the cavity 56 being insulated between the ends of the two insulation modules 44 and 46, the insulation modules 44 and 46 will expand to bring the adjacent ends 58 and 60 of the insulation modules 44 and 46 together and enclose the utilities 54 within the modularized, encapsulated insulation assembly 20 without having to cut open or tear the envelope 26 encapsulating the insulation material 24.

Figure 10:
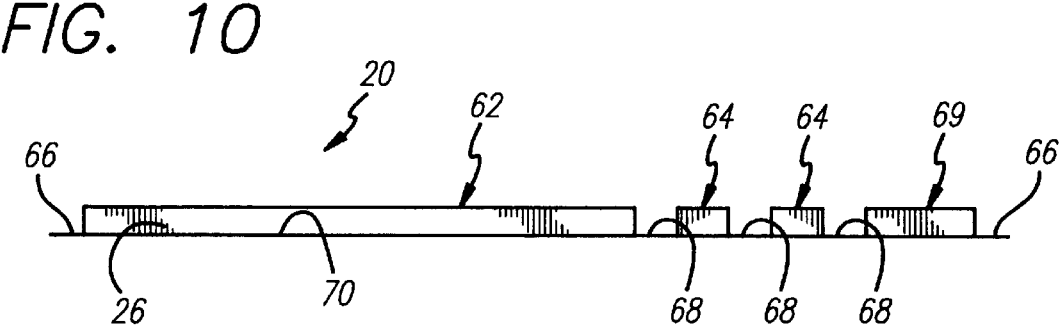
FIG. 10 is a schematic side view of the fifth embodiment of the encapsulated insulation assembly of the present invention for accommodating the passage of utilities through the insulation assembly.
Figure 11:
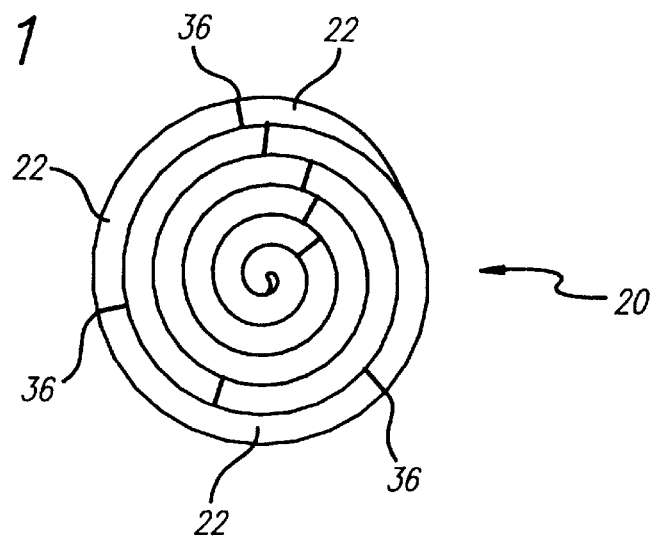
FIG. 11 is a schematic side view of the encapsulated insulation assembly of the present invention in roll form.

FIG. 10 shows another embodiment of the modularized, encapsulated insulation assembly 20, especially adapted for insulating walls, which has a first insulation module 62 that extends for about half or more of the length of the modularized, encapsulated insulation assembly (e.g. about forty six to about eighty four inches); and a series or plurality of second insulation modules 64 that combined extend for the remainder of the length of the modularized insulation assembly (e.g. from about twelve to about forty six inches). The second insulation modules 64 can be uniform in length (e.g. each of the second modules having a length ranging from about two inches to about eighteen inches) or the second insulation modules 64 can vary in length as shown in FIG. 10 with some of the second insulation modules 64 having greater lengths than other of the second insulation modules 64 (e.g. as shown in FIG. 10 the longer of the second insulation modules 64 could be about fifteen to about eighteen inches and the shorter of the second insulation modules 64 could each be about three to about six inches). Thus, the first insulation module 62 and the series of second insulation modules 64 are sized in length to provide a plurality of locations in the cavity along the length or height of the cavity where electrical wiring, plumbing or other utilities can be passed through the cavities being insulated by the insulation assemblies 20 at a convenient location without having to remove any insulation material or cut open the envelope 26 encapsulating the insulation material 24 within the insulation modules. As with the embodiment of FIGS. 7–9, after the utilities have been passed through the cavity being insulated between the opposed ends of two of the insulation modules (62–64 or 64—64), the insulation modules will expand to bring the adjacent or opposed ends of the insulation modules together and enclose the utilities within the modularized, encapsulated insulation assembly 20 without having to cut open or tear the envelope 26 encapsulating the insulation material 24 or create a significant thermal break in the insulation.

Other than the different lengths of the insulation modules 62 and 64, this embodiment of the modularized, encapsulated insulation assembly 20 is the same as the embodiment of FIGS. 1–6. The combined lengths of the first insulation module 62 and the series or plurality of second insulation modules 64, excluding the end tabs 66 and the connector strips 68, equals or about equals the standard height of a wall cavity e.g. about ninety three to about ninety six inches. The widths of the first insulation module 62 and the series of second insulation modules 64, excluding the side tabs 70, if any, equals or about equals a standard insulation width for wall cavities, e.g. about fifteen, sixteen, twenty three or twenty four inches in width. The insulation materials 24 within the insulation modules typically range in thickness from about three and one half to about six and one half inches and have R values ranging from 11 to 22. While the connector strips 68 can be center fold strips, preferably, the connector strips 68 are face folding strips, as shown in FIG. 10, so that the connector strips 68 do not obstruct the passage of the utilities through the cavity being insulated.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A modularized, encapsulated insulation assembly for insulating a wall, ceiling, floor or roof cavity of a standard width and of a length ranging from less than a standard length to at least a standard length, comprising:

a plurality of compressible, resilient insulation modules including at least a first insulation module at a first end of the insulation assembly and a second insulation module at a second end of the insulation assembly; the first and second insulation modules having outer ends which form opposite ends of the insulation assembly; the combined length of the plurality of insulation modules being equal to or greater than the standard length of the cavity and each of the insulation modules having a width substantially equal to the width of the cavity;

each of the insulation modules having a first major surface and a second major surface; each of the insulation modules comprising a compressible, resilient insulation material having a first major surface and a second major surface, lateral edge surfaces extending between the first and second major surfaces and end edge surfaces extending between the first and second major surfaces; the insulation material of each of the insulation modules being encapsulated within a flexible envelope which overlays and encloses within the envelope the first and second major surfaces of the insulation material, the lateral edge surfaces of the insulation material, and at least one end edge surface of the insulation material; the envelope having venting means in each of the insulation modules for permitting air to pass out of the envelope during compression of the insulation modules and into the envelope during expansion of the insulation module; and each pair of adjacent insulation modules of the insulation modules being joined by a flexible connector strip extending between adjacent ends of the pair of adjacent insulation modules.

2. The modularized, encapsulated insulation assembly according to claim 1, wherein: the envelope overlays and encloses both of the end edge surfaces of the insulation material of each insulation module including the outer ends of the first and second insulation modules.

3. The modularized, encapsulated insulation assembly according to claim 1, wherein: the venting means comprise pores in the envelope.

4. The modularized, encapsulated insulation assembly according to claim 1, wherein: each of the connector strips is integral with the envelope encapsulating the plurality of insulation modules.

5. The modularized, encapsulated insulation assembly according to claim 1, wherein: each of the connector strips has a transverse tear line for facilitating the separation of the plurality insulation modules at the connector strip.

6. The modularized, encapsulated insulation assembly according to claim 1, wherein: the envelope comprises a polymeric film and the venting means comprises pores in the polymeric film.

7. The modularized, encapsulated insulation assembly according to claim 1, wherein: each of the connector strips lies in a plane coinciding with or substantially coinciding with the first major surfaces of the insulation modules.

8. The modularized, encapsulated insulation assembly according to claim 1, wherein: each the connector strips lies in a plane substantially midway between and extending substantially parallel to the first and second major surfaces of the insulation modules.

9. The modularized, encapsulated insulation assembly according to claim 1, wherein: the insulation material is a bonded fibrous batt.

10. The modularized, encapsulated insulation assembly according to claim 1, wherein: the insulation material is an unbonded fibrous batt.

11. The modularized, encapsulated insulation assembly according to claim 1, wherein: the insulation material is a foam insulation.

12. The modularized, encapsulated insulation assembly according to claim 1, wherein: the first and second insulation modules are each about forty six to about forty eight inches in length, between about fifteen and about twenty four inches in width and the same thickness; the insulation material is a bonded glass fiber batt; the connector strip is integral with the envelope, lies in a plane coinciding with or substantially coinciding with a plane of the first major surfaces of the first and second insulation modules, and has a transverse tear line for facilitating the separation of the first and second insulation modules.

13. The modularized, encapsulated insulation assembly according to claim 12, wherein: portions of the envelope overlaying the first major surface of each of the insulation materials has a permeability, and a combined permeability of the portions of the envelope, when the first major surfaces of the first and second modules are in contact, is sufficiently high that the portions of the envelope do not function as a vapor barrier when in contact.

14. The modularized, encapsulated insulation assembly according to claim 1, wherein: the first and second insulation modules are each about forty six to about forty eight inches in length, between about fifteen and about twenty four inches in width and the same thickness; the insulation material is a bonded glass fiber batt; the connector strip is integral with the envelope, lies in a plane substantially midway between and extending substantially parallel to planes of the first major surfaces of the first and second insulation modules, and has a transverse tear line for facilitating the separation of the first and second insulation modules.

15. The modularized, encapsulated insulation assembly according to claim 14, wherein: portions of the envelope overlaying the first major surface of each of the insulation materials has a permeability, and a combined permeability of the portions of the envelope, when the first major surfaces of the first and second modules are in contact, is sufficiently high that the portions of the envelope do not function as a vapor barrier when in contact.

16. The modularized, encapsulated insulation assembly according to claim 1, wherein: the first and second insulation modules are each about forty six to about forty eight inches in length, between about fifteen and about twenty four inches in width and the same thickness; the insulation material is an unbonded glass fiber batt; the connector strip is integral with the envelope, lies in a plane coinciding with or substantially coinciding with a plane of the first major surfaces of the insulation material, and has a transverse tear line for facilitating the separation of the first and second insulation modules.

17. The modularized, encapsulated insulation assembly according to claim 16, wherein: portions of the envelope overlaying the first major surface of each of the insulation materials has a permeability, and a combined permeability of the portions of the envelope, when the first major surfaces of the first and second modules are in contact, is sufficiently high that the portions of the envelope do not function as a vapor barrier when in contact.

18. The modularized, encapsulated insulation assembly according to claim 1, wherein: the first and second insulation modules are each about forty six to about forty eight inches in length, between about fifteen and about twenty four inches in width and the same thickness; the insulation material is an unbonded glass fiber batt; the connector strip is integral with the envelope, lies in a plane substantially midway between and extending substantially parallel to planes of the first major surfaces of the first and second insulation modules, and has a transverse tear line for facilitating the separation of the first and second insulation modules.

19. The modularized, encapsulated insulation assembly according to claim 18, wherein: portions of the envelope overlaying the first major surface of each of the insulation materials has a permeability, and a combined permeability of the portions of the envelope, when the first major surfaces of the first and second modules are in contact, is sufficiently high that the portions of the envelope do not function as a vapor barrier when in contact.

20. The modularized, encapsulated insulation assembly according to claim 1, wherein: the first insulation module is about sixty to about eighty four inches in length and said second insulation module is about twelve to about thirty six inches in length; the first and second insulation modules are between about fifteen and about twenty four inches in width and the same thickness; the insulation material is a bonded glass fiber batt; and the connector strip is integral with the envelope, lies in a plane coinciding with or substantially coinciding with a plane of the first major surfaces of the first and second insulation modules.

21. The modularized, encapsulated insulation assembly according to claim 1, wherein: the first insulation module is about sixty to about eighty four inches in length and said second insulation module is about twelve to about thirty six inches in length; the first and second insulation modules are between about fifteen and about twenty four inches in width and the same thickness; the insulation material is an unbonded glass fiber batt; and the connector strip is integral with the envelope, lies in a plane coinciding with or substantially coinciding with a plane of the first major surfaces of the first and second insulation modules.

22. The modularized, encapsulated insulation assembly according to claim 1, wherein: the first insulation module is about sixty to about eighty four inches in length and said second insulation module is about twelve to about thirty six inches in length; the first and second insulation modules are between about fifteen and about twenty four inches in width and the same thickness; the insulation material is a foam insulation material; and the connector strip is integral with the envelope, lies in a plane coinciding with or substantially coinciding with a plane of the first major surfaces of the first and second insulation modules.

23. The modularized, encapsulated insulation assembly according to claim 1, including: an intermediate insulation module intermediate the first and second insulation modules with each of the insulation modules being between about twelve and about thirty two inches in length.

24. The modularized, encapsulated insulation assembly according to claim 1, including: a plurality of intermediate insulation modules intermediate the first and second insulation modules; the first insulation module being about forty six to about eight four inches in length; the second insulation module and the intermediate insulation modules each being between about two and about eighteen inches in length; and the second insulation module and the intermediate insulation modules having a combined length of about twelve to about forty six inches.

25. An insulated wall cavity comprising;
   a cavity having a ranging from less than a standard length to at least a standard length for a wall cavity and a standard width for a wall cavity;
   a modularized, encapsulated insulation assembly comprising a plurality of compressible, resilient insulation modules including at least a first insulation module at a first end of the insulation assembly and a second insulation module at a second end of the insulation assembly; the first and second insulation modules having outer ends which form opposite ends of the insulation assembly; the first insulation module being about sixty to about eighty four inches in length and the second insulation module being about twelve to about thirty six inches in length; the first and second insulation modules being between about fifteen and about twenty four inches in width and the same thickness; the combined length of the plurality of insulation modules being equal to or greater than the length of the cavity and each of the insulation modules having a width substantially equal to the width of the cavity;
   each of the insulation modules having a first major surface and a second major surface; each of the insulation modules comprising a compressible, resilient insulation material having a first major surface and a second major surface, lateral edge surfaces extending between the first and second major surfaces and end edge surfaces extending between the first and second major surfaces; the insulation material being encapsulated within a flexible envelope which overlays and encloses within the envelope the first and second major surfaces of the insulation material, the lateral edge surfaces of the insulation material, and the end edge surfaces of the insulation material except for the end edge surfaces at the opposite ends of the insulation assembly; the envelope having venting means in each of the insulation modules for permitting air to pass out of the envelope during compression of the insulation modules and into the envelope during expansion of the insulation module;
   each pair of adjacent insulation modules of the insulation modules being joined by a flexible connector strip extending between adjacent ends of the pair of adjacent insulation modules; and the connector strip is integral with the envelope, lies in a plane coinciding with or substantially coinciding with a plane of a the first major surfaces of the first and second insulation modules; and
   a utility passing through the insulated cavity intermediate a pair of the adjacent modules.

26. The insulated wall cavity according to claim 25, wherein:
   the insulation material is a bonded glass fiber batt.

27. The insulated wall cavity according to claim 25, wherein:
   the insulation material is an unbonded glass fiber batt.

28. The insulated wall cavity according to claim 25, wherein:
   the insulation material is a foam insulation material.

29. The modularized, encapsulated insulation assembly according to claim 1, wherein: portions of the envelope overlaying the first major surface of each of the insulation materials have a permeability, and the combined permeability of the portions of the envelope, when in contact, is sufficiently high that the portions of the envelope do not function as a vapor barrier when in contact.

\* \* \* \* \*